Feb. 22, 1966     H. R. MALLORY     3,237,078
RECHARGEABLE BATTERIES AND REGULATED CHARGING MEANS THEREFOR
Filed March 14, 1963     2 Sheets-Sheet 1

INVENTOR.
HENRY ROGERS MALLORY
BY
*[signature]*
ATTORNEY

INVENTOR.
HENRY ROGERS MALLORY
BY
ATTORNEY

United States Patent Office 3,237,078
Patented Feb. 22, 1966

3,237,078
RECHARGEABLE BATTERIES AND REGULATED CHARGING MEANS THEREFOR
Henry Rogers Mallory, Greenwich, Conn., assignor to P. R. Mallory & Co., Inc., Indianapolis, Ind., a corporation of Delaware
Filed Mar. 14, 1963, Ser. No. 265,186
9 Claims. (Cl. 320—17)

This invention relates to rechargeable batteries, and, more particularly, to a rechargeable battery which includes means for preventing overcharge of any one of a group of serially connected rechargeable cells contained therein.

A major problem encountered in recharging electric storage cells and batteries is that of terminating the charging current once all the electrodes have been fully reconstituted. If charging is continued beyond that point, gases are liberated at the electrodes at the expense of the electrolyte. In open or vented cells these gases can escape although there will be some damage to the electrodes which can become significant if the overcharge is prolonged or recurs successively. In sealed cells, however, this is a much more acute problem since the liberated gases will accumulate within the casing and can eventually cause it to rupture or explode. It is, therefore, imperative to avoid overcharging of sealed cells and batteries.

The condition of full charge of an electric storage cell corresponds to a fairly well defined maximum terminal voltage. Application of a direct supply voltage of slightly greater value across the terminals of the cell for a sufficient time will, therefore, effect full recharge. If a higher voltage is applied for a longer period, the terminal voltage will rise into the overcharge region and gas generation will occur in the cell. Although it is necessary to avoid this for the reasons stated, it is difficult to do so when recharging a battery comprising a number of cells connected in series. Due to inevitable slight variations in the electrochemical capacities of the cells, some will become discharged to a greater extent than others while the battery is in service. Consequently, when the battery is recharged, those cells will require a longer period than the others to come up to full charge. Since recharging is continued until the terminal voltage of the battery reaches the sum of the voltages corresponding to full charge of all of the cells therein, at least some cells will be subjected to different degrees of overcharge and undergo gas generation. Series recharging of sealed cells and batteries has therefore been regarded as undesirable except with certain specific types of cells where the electro-chemical system is itself capable of absorbing any liberated gases. This is not true of many types of cells which have superior characteristics in other respects, such as a rechargeable cell disclosed and claimed in Ruben Patent 2,544,504 comprising a zinc anode, an alkaline electrolyte, and a depolarizer comprising a mixture of mercuric oxide and silver powder.

To prevent overcharge of any of the cells of a storage battery during serial recharging to full voltage, it was already proposed to provide voltage-sensitive protective means for diverting charging current supplied to the battery around any cell therein when the terminal voltage of such cell has reached the level corresponding to full charge thereof. A system of this type is disclosed and claimed in a co-pending application of James M. Booe, Wallace D. Loftus and Robert E. Ralston, Serial No. 95,291, filed March 13, 1961, and entitled "Rechargeable Battery," now Patent No. 3,148,322, granted September 8, 1964. In this system the storage battery comprising a plurality of serially connected rechargeable cells included a like plurality of voltage-sensitive current gating means respectively shunting the cells. Each such gating means had a very low conductivity when the terminal voltage of the cell shunted thereby was below its predetermined maximum value and became highly conductive when the cell terminal voltage incrementally exceeded that value. As a result, charging current supplied to the battery was bypassed by the gating means around any cell which has attained the fully charged condition and overcharge thereof was prevented. Preferably, the voltage-sensitive gating means referred to were so-called stabistors, in other words one or more semiconductor diodes connected in series and operating in the forward direction, utilizing the forward threshold characteristics of such diodes. As to the incorporation of other gating means suitable for stabistor operation, reference may be had to the above-mentioned co-pending application, Ser. No. 95,291.

Stabistor regulators of the described character have been found to constitute very satisfactory and successful charge control regulators for serially connected sealed rechargeable cells of various types. Certain practical difficulties have been experienced, however, due to the fact that in commercially available stabistors or semiconductor diodes, the forward threshold or "knee of the curve" was not sharp enough to prevent the flow of a substantial discharge current through the shunting stabistors after charging the battery was discontinued. This discharge current, which was in the range of about 1½ to 4 milliamperes, was due to the limited difference between the useable discharge voltage and the regulator voltage, and would quickly discharge the cell when the stabistor regulators were permanently connected across the cells. Therefore, when not under charge, the stabistor regulators had to be disconnected from the battery by providing a plug-in arrangement or switches which increased the cost and complexity of the circuit and were not practical or convenient in some devices.

It is an object of the invention to improve rechargeable batteries comprising a plurality of serially connected cells.

It is another object of the invention to provide means by which a plurality of electric storage cells may be serially recharged without the danger of any one of the cells becoming overcharged while being connected to the charging current source, or becoming self-discharged after being disconnected from such source.

It is also within contemplation of the invention to provide an electric storage battery including voltage-sensitive protective means for diverting charging current supplied to the battery around any cell therein when the terminal voltage of such cell has reached the level corresponding to full charge thereof, and means for disconnecting or disabling said protective means when no charging current is supplied to the battery.

The invention also contemplates a novel and improved rechargeable battery and regulated charging means therefor, which is substantially completely free from back leakage current and which may be readily manufactured and sold on a practical and commercial scale at a low cost.

Other and further objects and advantages of the present invention will become apparent from the following description and the accompanying drawings, in which.

Broadly stated, in accordance with the principles of the invention, there is provided an electric storage battery comprising a plurality of rechargeable cells connected in series, means for applying a charging voltage across the battery at least equal to the sum of the maximum voltages of said cells in their fully charged condition, and a plurality of voltage-sensitive current gating means respectively shunting said cells, said gating means being poorly conductive when the cell shunted thereby is below the fully charged value and becoming highly conductive when such voltage exceeds said value. There are further provided a plurality of solid state switching devices respectively interposed in the shunting circuits of the said cells, said switching devices normally disabling or interrupting said shunting circuits and being responsive to the application of charging voltage to the battery to complete said shunting circuits. Although there are various solid state switching devices which are suitable for the purposes of the invention, it is preferred to use a transistor having a base, an emitter and a collector, one such transistor being provided for each cell of the battery. All three elements or electrodes of the transistor, the emitter base and collector, are serially connected in the shunting circuit of the cell. As to the base, it is so connected in the charging circuit that in the absence of charging current only a "back leak" or discharge current of a few micro-amperes can flow between emitter and collector, thus effectively isolating the cells from both the stabistor regulators and the charging rectifier. On the other hand, as soon as the charger is connected to the A.C. power line or to a suitable D.C. source of charging current, the transistors completely saturate as all of the charging current will either flow through the bases of the transistors or otherwise saturate the transistors. Effectively, this connects the stabistor regulators across the cells with a minimum voltage drop (less than 0.1 volt) and the stabistor regulators operate in the normal well-understood manner to regulate the charge. As an example of the transistor voltage drops in a typical charger circuit embodying the invention with a maximum charging rate of 27 milliamperes, the base-to-emitter voltage drop measured 0.46 volt; base-to-collector voltage drop 0.53 volt, and emitter-to-collector voltage 0.07 volt. These figures clearly indicate the efficiency of a transistor as a switching device in accordance with the principles of the present invention. The transistors used may be of the NPN or of the PNP type, or may comprise both types in combination with each other.

Figure 1:
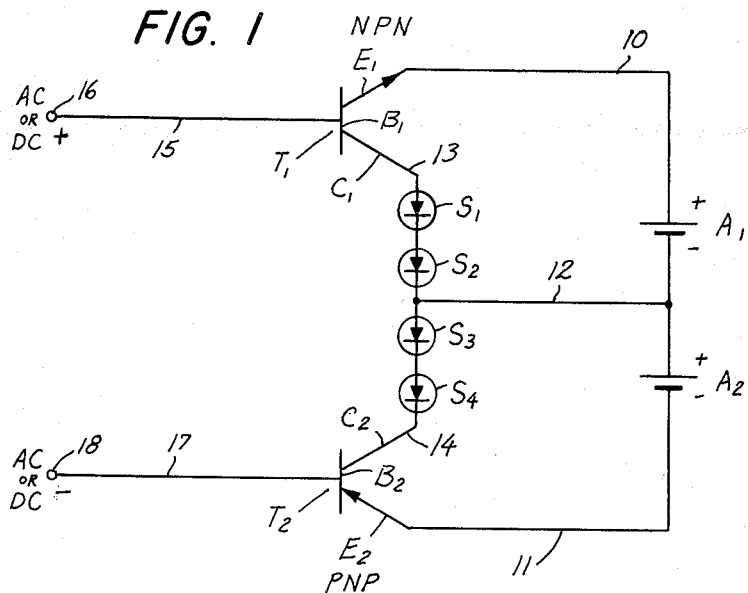
FIG. 1 is a circuit diagram of a rechargeable storage battery comprising a pair of cells and regulated charger means therefor, embodying the invention.

Referring now more particularly to FIG. 1 of the drawing, a preferred embodiment of the invention will be described comprising a pair of serially connected rechargeable cells $A_1$ and $A_2$; two stabistor regulators, which in this particular embodiment are represented by diodes $S_1$, $S_2$, $S_3$, and $S_4$; an NPN transistor $T_1$, having a base $B_1$, a collector $C_1$, and an emitter $E_1$; and a PNP transistor $T_2$ having a base $B_2$, a collector $C_2$ and an emitter $E_2$. Emitter $E_1$ is connected to the positive terminal of cell $A_1$ through conductor 10, emitter $E_2$ is connected to the negative terminal of cell $A_1$ through conductor 11, and a conductor 12 connects the common terminals of stabistors $S_2$ and $S_3$ to the common terminals of cells $A_1$ and $A_2$. Collector $C_1$ is connected to the anode terminal of stabistor $S_1$ through a conductor 13 and collector $C_2$ is connected to the cathode terminal of stabistor $S_4$ through a conductor 14. A conductor 15 connects positive charging current input terminal 16 to base $B_1$ and a similar conductor 17 connects negative charging current input terminal 18 to base $B_2$.

It has been found that with a suitable A.C. source connected to input terminals 16 and 18, transistors $T_1$ and $T_2$ will not only operate as semiconductor switches as described in the foregoing but will also rectify the A.C. to D.C. suitable for charging cells $A_1$ and $A_2$. When the A.C. source is positive at terminal 16, charging current will readily flow through conductor 15, to base $B_1$ of $T_1$, saturating $T_1$ to $E_1$ and $C_1$, through conductor 10, cells $A_1$ and $A_2$, through conductor 11 to $C_2$ of $T_2$, and $B_2$, which saturates $T_2$ and effectively connects $C_2$ and $E_2$, through conductor 17 to terminal 18 and back to the other end of the A.C. source. When the A.C. source is in reverse phase so that terminal 16 is negative, transistors $T_1$ and $T_2$ are cut off or blocking so that essentially no current will flow. With a suitable A.C. applied to terminals 16 and 18, the circuit shown in FIG. 1 operates as a half wave rectifier, as well as operating in the same manner as the semiconductor switch-stabistor regulator disclosed in detail in the preceding paragraph.

Although FIG. 1 shows emitters connected to the cells and collectors connected to the stabistors, it has been found that the reverse connection, such as collectors connected to the cells and emitters connected to the stabistors, operates just about as effectively. The preferred connection is the one which produces the minimum leakage current when not under charge.

Figure 2:
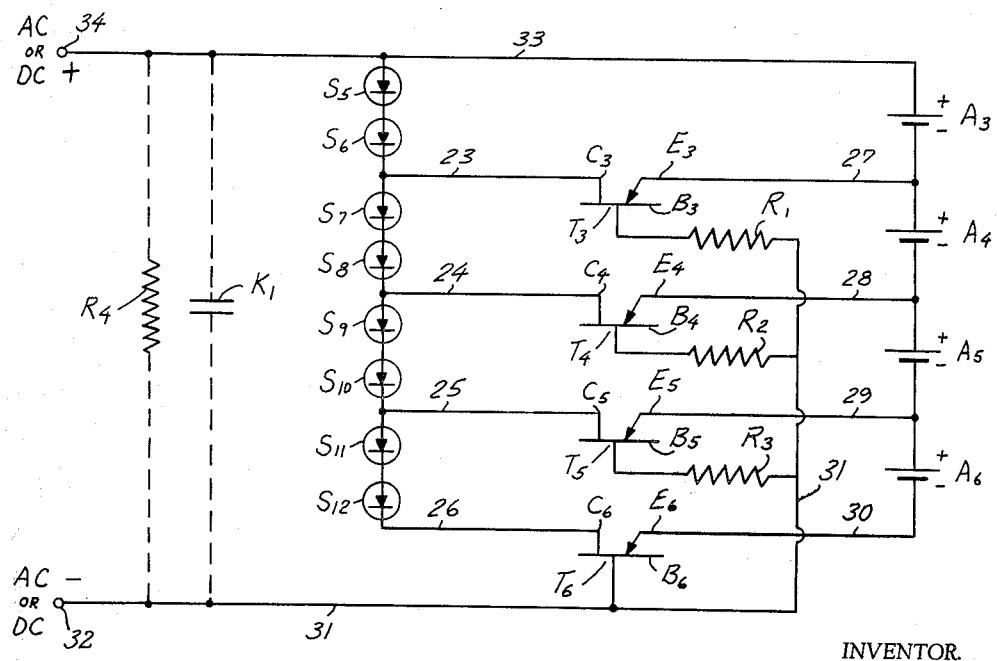
FIG. 2 is a similar circuit diagram of a modified embodiment of the invention suitable for multi-cell batteries.

From the foregoing description, the operation of the circuit embodying the invention will be readily understood by those skilled in the art. Initially, when the system is not under charge or the charging source input, either A.C. or D.C. is not connected to a power source, no current will flow through base $B_1$ or $B_2$ so that the respective transistors $T_1$ and $T_2$ are biased to cut-off. In this condition only a few microamperes can flow between collector $C_1$ and emitter $E_1$ depending upon the leakage characteristics of transistor $T_1$ and the same is true of collector $C_2$ and emitter $E_2$ of transistor $T_2$. Stabistor regulators $S_1$ and $S_2$ will thus be effectively disconnected from cell $A_1$ and stabistor regulators $S_3$ and $S_4$ will be effectively disconnected from cell $A_2$. Due to the extremely low "back leak" or discharge current through transistors $T_1$ and $T_2$, the cells will not be self-discharged to any appreciable extent even though this condition may exist for several weeks or months. On the other hand, as soon as the circuit is connected to the source of charging current, such as a suitable A.C. or D.C. power source, transistors $T_1$ and $T_2$ completely saturate, since all of the charging current will flow through base $B_1$ and base $B_2$ of the respective transistors. This will effectively connect stabistors $S_1$ and $S_2$ across cell $A_1$ and stabistors $S_3$ and $S_4$ across cell $A_2$ so that the stabistor regulators can operatt to regulate the charging current, by-passing the cells which have been fully charged whereby overcharging of any one of the cells is positively prevented. This is made possible by the fact that, in the saturated condition of the transistor, the voltage drop between emitter and collector is quite low, generally less than 0.1 volt.

Where the battery comprises more than 2 cells in series, the modified circuit shown in FIG. 2 may be used. As illustrated in the drawing, all of the transistors are of the PNP type although equal or similar results may be obtained by making all transistors of the NPN type. The circuit essentially comprises four serially connected rechargeable cells, $A_3$, $A_4$, $A_5$ and $A_6$, eight serially connected stabistors $S_5$, $S_6$, $S_7$, $S_8$, $S_9$, $S_{10}$, $S_{11}$, and $S_{12}$, four transistors $T_3$, $T_4$, $T_5$, $T_6$, respectively having emitters $E_3$, $E_4$, $E_5$, $E_6$, collectors $C_3$, $C_4$, $C_5$, $C_6$ and bases $B_3$, $B_4$, $B_5$, $B_6$. Collectors $C_3$, $C_4$, $C_5$, $C_6$ are respectively connected to the cathode terminals of stabistors $S_6$, $S_8$, $S_{10}$, $S_{12}$ through conductors 23, 24, 25, 26; whereas emitters $E_3$, $E_4$, $E_5$, $E_6$ are respectively connected to the negative terminals of cells $A_3$, $A_4$, $A_5$, $A_6$, through conductors 27, 28, 29, 30. Bases $B_3$, $B_4$, $B_5$ are respectively connected through resistances $R_1$, $R_2$, $R_3$ and base $B_6$ is directly connected to negative bus bar 31, ending in negative charging terminal 32. Positive bus bar 33 is connected to the positive terminals of stabistor $S_5$ and of cell $A_3$ and ends in positive charging terminal 34. Since in this circuit the biasing voltage supply is different for each transistor, the resistance values for $R_1$, $R_2$ and $R_3$ should be in arithmetic progression. Thus, typical values for a 25–30 milliampere maximum charging rate circuit are 1,500 ohms for $R_1$, 1000 ohms for $R_2$, and 500 ohms for $R_3$. Although not absolutely necessary for making the circuit operate, it has been found that connection of resistance $R_4$ and capacitor $K_1$ (indicated in dotted lines) across bus bars 31 and 33 is advantageous in that they substantially reduce the discharge current and more fully block the transistors $T_3$, $T_4$, $T_5$, $T_6$ in the non-charging condition. For the above mentioned charging rates and resistance values of $R_1$, $R_2$ and $R_3$, a typical value for $R_4$ may be 8200 ohms and for capacitor $K_1$ 100 microfarads.

To understand the operation of the circuit, let it be first assumed that the circuit is not under charge. There will be no charging current flowing through bases $B_3$, $B_4$, $B_5$, $B_6$ of transistors $T_3$, $T_4$, $T_5$, $T_6$ so that the said transistors will be biased to cut-off. Thus, stabistor pairs $S_5$–$S_6$; $S_7$–$S_8$; $S_9$–$S_{10}$; $S_{11}$–$S_{12}$ will be effectively disconnected from cells $A_3$, $A_4$, $A_5$, $A_6$, respectively, except for a very small "back leak" or discharge current in the neighborhood of 2–10 microamperes, which would not cause any significant discharge of the cells even during long periods of time.

Upon connecting terminals 34, 32 to a source of charging current, the charging circuit for the cells $A_3$, $A_4$, $A_5$ and $A_6$ can be traced as follows: 34, 33, $A_3$, $A_4$, $A_5$, $A_6$, 30, $E_6$, $B_6$, 31, 32.

Current will thus flow from the negative charging terminal 32, through conductor 31 to the base of transistor $T_6$ and through resistors $R_1$, $R_2$ and $R_3$ to the bases of the other transistors $T_3$, $T_4$ and $T_5$, all of which will become saturated and will reduce the voltage drop between their respective emitters and collectors to a negligible value. Stabistor pairs $S_5$, $S_6$; $S_7$, $S_8$; $S_9$, $S_{10}$; $S_{11}$, $S_{12}$ will be connected across cells $A_3$, $A_4$, $A_5$, $A_6$, respectively, and will effectively by-pass the charging current around any cell which has been charged to its full terminal voltage.

Figure 3:
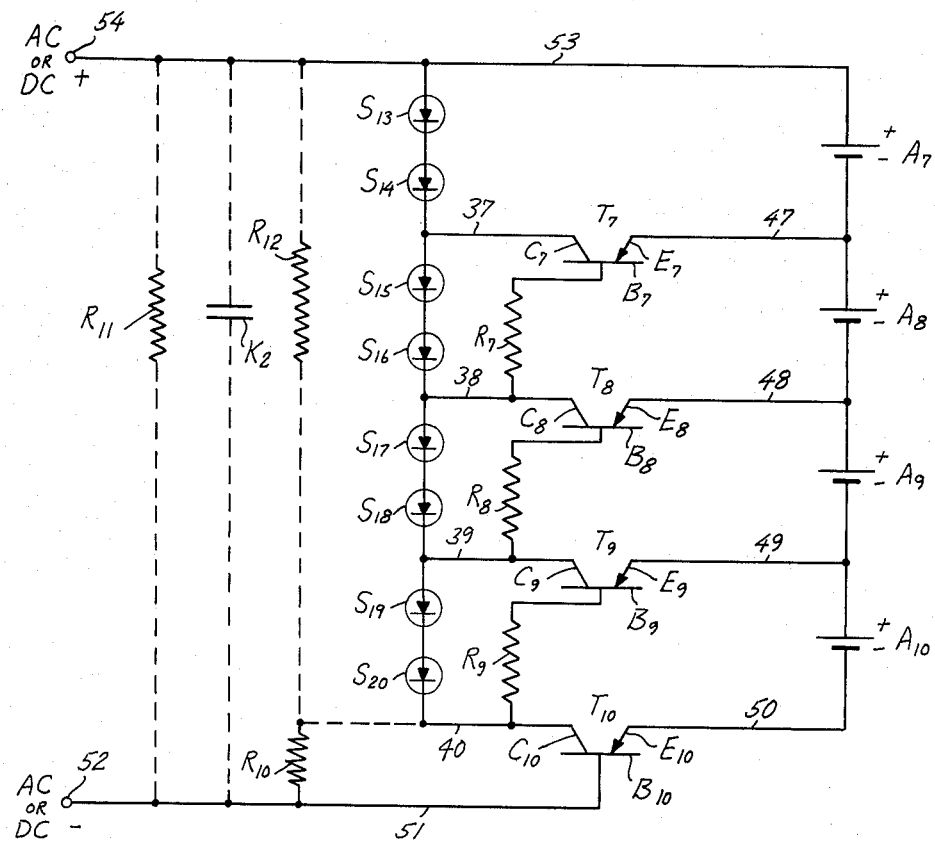
FIG. 3 is a circuit diagram of a further modified embodiment of the invention, which is specially adaptable to multi-cell batteries.

Another regulated charger circuit for multi-cell batteries is shown in FIG. 3. This circuit comprises four serially connected rechargeable cells $A_7$, $A_8$, $A_9$ and $A_{10}$; eight serially connected stabistors $S_{13}$, $S_{14}$, $S_{15}$, $S_{16}$, $S_{17}$, $S_{18}$, $S_{19}$, and $S_{20}$; four PNP transistors $T_7$, $T_8$, $T_9$ and $T_{10}$, respectively having emitters $E_7$, $E_8$, $E_9$, $E_{10}$, collectors $C_7$, $C_8$, $C_9$, $C_{10}$ and bases $B_7$, $B_8$, $B_9$, $B_{10}$. Collectors $C_7$, $C_8$, $C_9$, $C_{10}$ are respectively connected to the cathode terminals of stabistors $S_{14}$, $S_{16}$, $S_{18}$, $S_{20}$ through conductors 37, 38, 39, 40; whereas emitters $E_7$, $E_8$, $E_9$, $E_{10}$ are respectively connected to the negative terminals of cells $A_7$, $A_8$, $A_9$, $A_{10}$, through conductors 47, 48, 49, 50. Base $B_7$ is connected to collector $C_8$ through a resistance $R_7$; base $B_8$ is connected to collector $C_9$ through a resistance $R_8$, and base $B_9$ is connected to collector $C_{10}$ through a resistance $R_9$. Base $B_{10}$ is connected to negative bus bar 51 ending in negative terminal 52. Positive bus bar 53 has its ends respectively connected to the positive terminal of cell $A_7$ and positive terminal 54 of the source of charging current. While not absolutely necessary, operation of the circuit is improved, more particularly the back leakage current is reduced, by connecting across bus bars 51 and 53 a resistance $R_{11}$, a capacitor K and serially connected resistances $R_{12}$, $R_{10}$, the common terminal of which is connected to collector $C_{10}$.

It will be noted that the circuit shown in FIG. 3 differs from that of FIG. 2 in that the base biasing resistors $R_7$, $R_8$, $R_9$ are respectively connected to the collectors $C_8$, $C_9$, $C_{10}$ of the PNP transistors associated with the next cell's negative terminal. As the available biasing voltage for each transistor is the same in each stage, the resistance value of $R_7$, $R_8$, $R_9$ will be the same assuming approximately uniform transistor betas. In practical regulated chargers embodying the circuit of FIG. 3 with a maximum charge current of 27 milliamperes, it has been found that a resistance of 150 ohms is about optimum for small signal germanium transistors having a beta range of 50–150.

Due to the similarity of the circuits shown in FIG. 2 and FIG. 3, the operation of latter circuit will be readily understood without any detailed explanation. It will be sufficient to state that in the absence of any charging current, all four transistors will be biased to cut-off. The leakage currents from the cells into the stabistor regulators through the transistors flowing in leads 53, 47, 48, 49, 50 will be approximately the same as in the circuit of FIG. 2, said leakage capable of being further reduced by the addition of $R_{10}$, $R_{12}$, $R_{11}$ and $K_2$. It has been found that the leakage appears to be higher from the more positive cells of the battery. Typical leakage readings with $R_{10}$—zero; $R_{12}$—8200 ohms; $R_{11}$—8200 ohms and $K_2$—zero are 7½ microamperes in lead 53; 2½ microamperes in lead 47; 3½ microamperes in lead 48; 2¼ microamperes in lead 49 and 0.2 microampere in lead 50. Under charging conditions, that is upon respectively connecting binding posts 54, 52 to the positive and negative terminals of a source of charging current, the transistors become saturated and will connect the respective stabistor pairs across cells $A_7$, $A_8$, $A_9$ and $A_{10}$ so that the said stabistor pairs can exert their previously described regulator function. Under saturation conditions, the voltage drops from emitter to collector of transistors $T_7$, $T_8$, $T_9$, $T_{10}$ have been found to average less than 0.1 volt, even under extreme operating conditions, such as either simulated open cells, or shorted cells.

Although the present invention has been disclosed in connection with a few preferred embodiments thereof, variations and modifications may be resorted to by those skilled in the art without departing from the principles of the invention. Thus, while in the three typical embodiments of the invention described in connection with the drawing two stabistors were provided for each cell, it is entirely possible to use only one, or a different plurality, such as 3, 4, or more, serially connected stabistors per cell, provided that the sum of the characteristic gating voltages of the said stabistors equals the maximum terminal voltage corresponding to full charge of said cell. All of these variations and modifications are considered to be within the true spirit and scope of the invention, as disclosed in the foregoing description and defined by the appended claims.

What is claimed is:

1. An electric storage battery comprising a plurality of rechargeable cells connected in series, means for applying a charging voltage across the battery at least equal to the sum of the maximum voltages of said cells in their fully charged condition, a plurality of voltage-sensitive current gating means respectively constituting shunting circuits for said cells, said gating means being poorly conductive when the voltage of the cell shunted thereby is below the fully charged value and becoming highly conductive when such voltage exceeds said value, and a plurality of solid state switching devices respectively interposed in the shunting circuit of the said cells, said switching devices normally disabling said shunting circuits and being responsive to the application of charging voltage to said battery to complete said shunting circuits.

2. An electric storage battery comprising a plurality of rechargeable cells connected in series, means for applying a charging voltage across the battery at least equal to the sum of the maximum voltages of said cells in their fully charged condition, a plurality of voltage-sensitive current gating means respectively constituting shunting circuits for said cells, said gating means being poorly conductive when the voltage of the cell shunted thereby is below the fully charged value and becoming highly conductive when such voltage exceeds said value, and a plurality of solid state switching devices having unidirectional characteristics respectively interposed in the shunting circuit of the said cells, said switching devices normally disabling said shunting circuits and being responsive to the application of a charging voltage selected from a direct and an alternating voltage to complete said shunting circuits and to cause the flow of charging current of the proper direction through said battery.

3. An electric storage battery comprising a plurality of sealed rechargeable cells respectively producing predetermined maximum terminal voltages upon attaining the fully charged condition; means connecting said cells in series additive relationship to form a battery; terminal means for said battery by which a charging voltage may be applied across said series combination of the cells at least equal to the sum of the maximum terminal voltages thereof; a plurality of voltage-sensitive current gating means respectively constituting shunting paths for said cells; said gating means being poorly conductive when the terminal voltage of the associated cell is below its predetermined maximum value and becoming highly conductive when the terminal voltage of such cell incrementally exceeds that value; a transistor having a base, an emitter, and a collector for each of said gating means; said emitter and collector being serially interposed in said shunting path; and means responsive to the flow of charging current to the battery to bias the base of said transistor to saturation thereby to make the corresponding shunting path effective, and to bias the base of said transistor to cut-off thereby to disable the corresponding shunting path in the absence of charging current.

4. A rechargeable electric storage battery comprising a plurality of rechargeable electric cells which respectively produce predetermined maximum terminal voltages upon attaining the fully charged condition; means connecting said cells in series additive relationship to form a battery; terminal means for said battery by which a charging voltage may be applied across said series combination of said cells at least equal to the sum of the maximum terminal voltages thereof; a shunting path for each of said cells serially including a diode semiconductor device and the emitter-collector portion of a transistor also having a base; each of said diode devices being only moderately conductive when the voltage thereacross is below a characteristic threshold level and becoming highly conductive when the voltage thereacross incrementally exceeds that level; the characteristic threshold voltage level of each of said diode devices being substantially the same as the predetermined maximum terminal voltage of the cell shunted thereby; and connections between said terminal means and the bases of said transistors; whereby upon the application of charging potential to said terminal means said transistors will be biased to saturation to make the respective shunting paths effective while in the absence of charging potential said transistors will be biased to cut-off to disable the respective shunting paths.

5. An electric storage battery comprising first and second rechargeable cells connected in series; an NPN and PNP transistor having each an emitter, a collector, and a base; first and second voltage-sensitive current gating means; a first shunt circuit connected across said first cell including the collector-emitter portion of said NPN transistor and said first gating means; a second shunt circuit connected across said second cell including the emitter-collector portion of said PNP transistor and said second gating means; each of said gating means being poorly conductive when the voltage of the cell shunted thereby is below the fully charged value and becoming highly conductive when such voltage exceeds said value; and means for applying a charging voltage at least equal to the sum of the maximum voltages of said cells in their fully charged condition to the bases of said transistors whereby in the presence of charging current said transistors will be biased to saturation rendering the shunt circuits and the gating means therein effective for regulating the charging current and in the absence of charging current said transistors will be biased to cut-off disabling said shunt circuits.

6. An electric storage battery comprising a plurality of rechargeable cells connected in series; a voltage sensitive current gating means and a transistor having an emitter, a collector and a base for each of said cells; a shunt circuit across each of said cells including the emitter-collector portion of at least one transistor and a gating means; each of said gating means being poorly conductive when the voltage of the cell shunted thereby is below the fully charged value and becoming highly conductive when such voltage exceeds said value; and a biasing circuit for each of said cells including the emitter-base portion of the corresponding transistor and a series biasing resistance whereby in the presence of charging current said transistors will be biased to saturation completing the shunt circuits and making the gating means therein effective for regulating the charging current and in the absence of charging current said transistors will be biased to cut-off interrupting said shunt circuits.

7. An electric storage battery as claimed in claim 5, in which the values of the biasing resistances are in arithmetic progression.

8. An electric storage battery as claimed in claim 5 in which a resistance and a capacitance are connected across the positive and negative terminals of the source of charging current.

9. An electric storage battery comprising a plurality of rechargeable cells connected in series; a voltage sensitive current gating means and a transistor having an emitter, a collector, and a base for each of said cells; a shunt circuit across each of said cells including the emitter-collector portion of at least one transistor and a gating means; each of said gating means being poorly conductive when the voltage of the cell shunted thereby is below the fully charged value and becoming highly conductive when such voltage exceeds said value; a biasing resistance for each transistor connected between the base of one transistor and the collector of the next adjoining transistor; a positive bus bar connected to the positive terminal of the first cell and a negative bus bar connected to the base of the transistor associated with the last cell of the series; and means for applying a charging voltage between said bus bars; whereby upon the flow of charging current through said cells said transistors will be biased to saturation and will complete the shunt circuits making the gating means therein effective for regulating the charging current and upon discontinuance of the flow of charging current will be biased to cut-off interrupting said shunt circuits.

No references cited.

LLOYD McCOLLUM, *Primary Examiner.*

S. WEINBERG, *Assistant Examiner.*